United States Patent [19]

Akamatsu

[11] 4,110,669
[45] Aug. 29, 1978

[54] SYNCHRONOUS MACHINE CONTROL SYSTEM

[75] Inventor: Masahiko Akamatsu, Amagasaki, Japan

[73] Assignee: Mitsubishi Denki Kabushiki Kaisha, Amagasaki, Japan

[21] Appl. No.: 744,593

[22] Filed: Nov. 24, 1976

[30] Foreign Application Priority Data

Jan. 28, 1976 [JP] Japan .................................. 51-8145

[51] Int. Cl.² ........................................... H02K 29/00
[52] U.S. Cl. ................................................. 318/175
[58] Field of Search .............. 318/188, 190, 175, 138, 318/254, 174, 171

[56] References Cited

U.S. PATENT DOCUMENTS 3,612,970  10/1971  Sotan ..................................... 318/175
3,749,991  7/1973  Kuniyoshi et al. .................. 318/175

Primary Examiner—Herman J. Hohauser
Attorney, Agent, or Firm—Oblon, Fisher, Spivak, McClelland & Maier

[57] ABSTRACT

A system for controlling synchronous machines of the type comprising an ac winding, a dc excitation winding opposite to the ac winding across a gap, and a static switch connected to the ac winding is disclosed wherein a current variation is given to the dc excitation winding at commutation in the ac winding current.

13 Claims, 43 Drawing Figures

BEFORE COMMUTATION

AFTER COMMUTATION

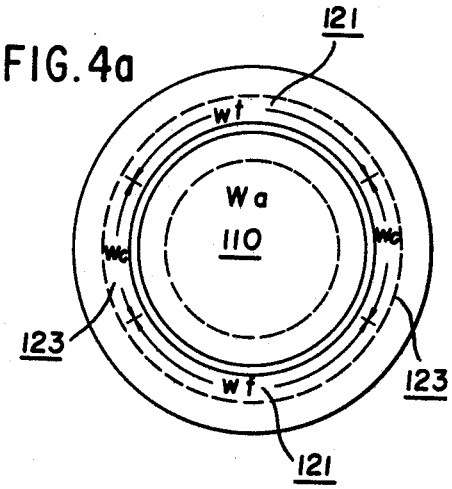
FIG.4a
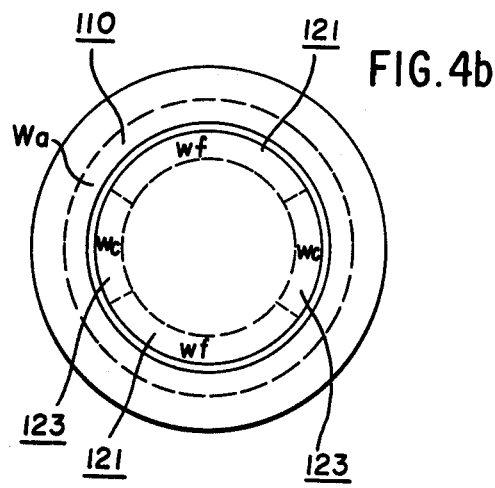
FIG.4b
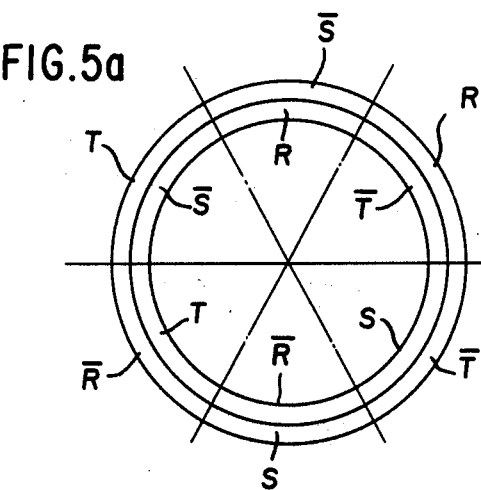
FIG.5a
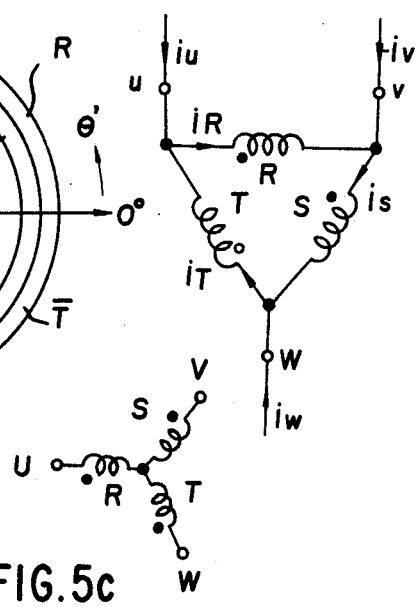
FIG.5b
FIG.5c

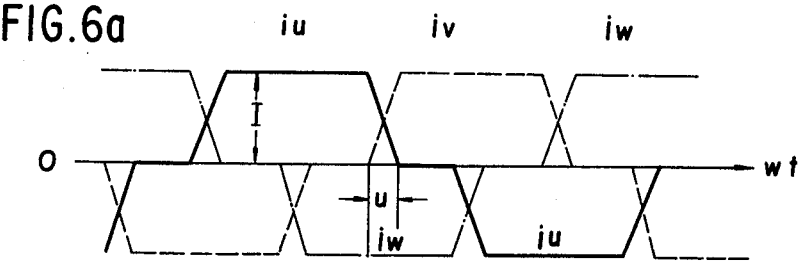
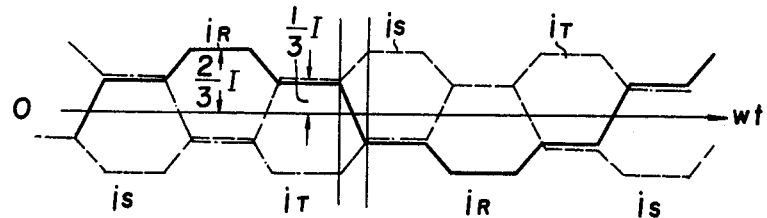
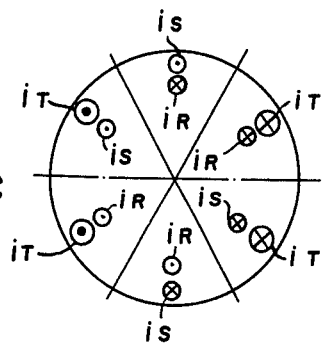
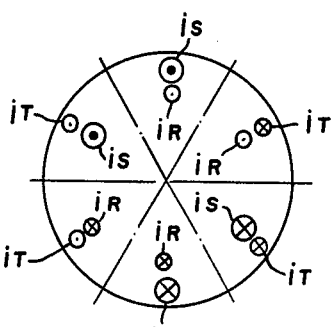
BEFORE COMMUTATION  AFTER COMMUTATION
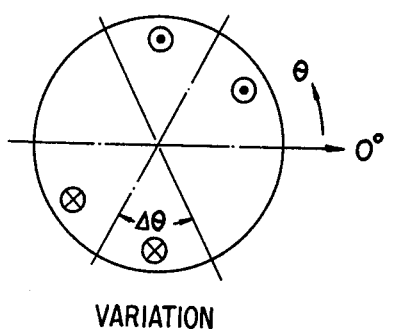
VARIATION

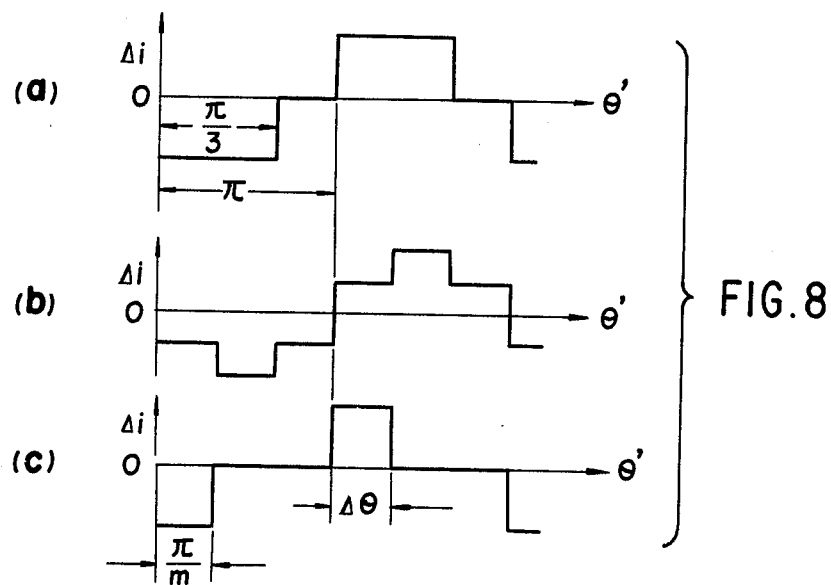
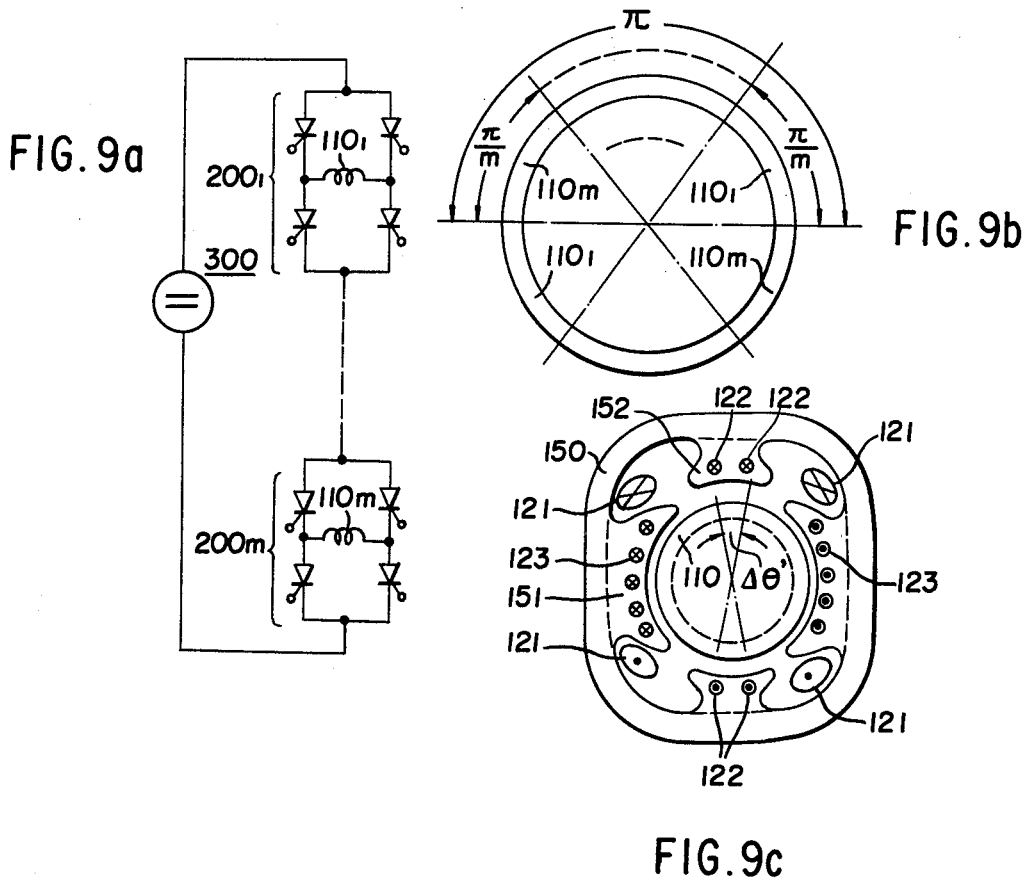

FIG. 11
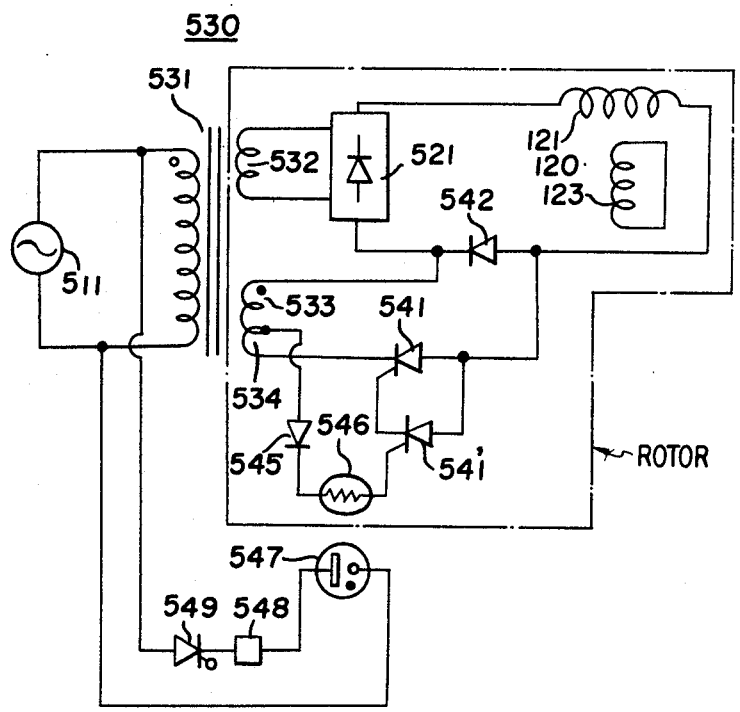
FIG. 12a
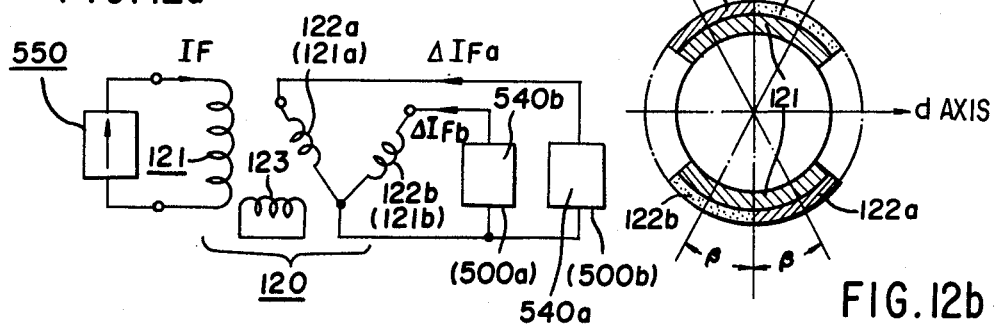
FIG. 12b

FIG. 13a
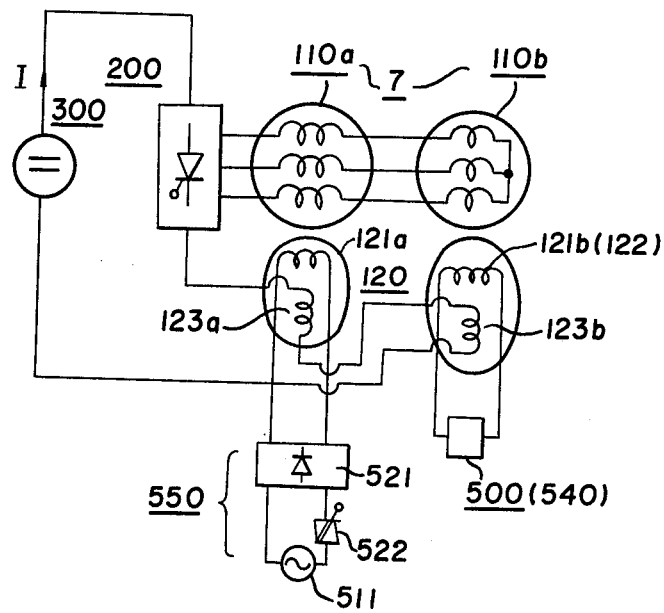
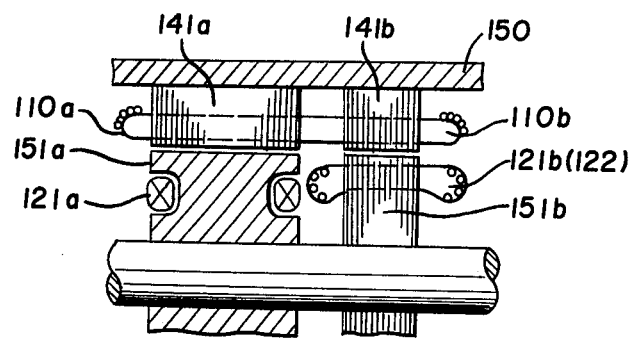
FIG. 13b

SYNCHRONOUS MACHINE CONTROL SYSTEM

BACKGROUND OF THE INVENTION

The present invention relates to synchronous machines of the type comprising an ac winding and an inverter or like static switch connected to the ac winding.

Synchronous machines have been known, for example, as the noncommutator motor comprising an ac winding, a static switch connected to the ac winding, and a dc winding. In this type of synchronous machine, the current in the ac winding should be commutated. To this effect, a turn-off at the static switch is supposed to occur at a timing after decrease in the current in the static switch. In an electric valve used as the static switch a turn-off at the switch can take place only after decrease in the current in the switch. In a transistor switch, it is also desirable that its turn-off occurs at a timing at which the current in the switch is already on the decrease, in order to reduce power for turn-off switching. Further, in a synchronous machine in which on-off operation at the static switch causes the current in the ac winding to be sequentially changed, the prime aim of such machine is to bring about change (or commutation) in the current in the ac winding. In this specification, therefore, the recovery of nonconductivity (i.e., turn-off, or extinction in the electric valve) of the static switch is discriminated from the sequential change in the current in the ac winding; the sequential change in the current therein will hereinafter be referred to as commutation.

In a prior art synchronous machine control system, the separately excited commutation method has been employed in which the commutation is done by an electromotive force ascribed to magnetic fluxes from the ac winding and from the dc winding, the fluxes being in motion relative to each other. Another prior art system has employed a suitable means for use with the static switch. In practice, however, the former approach is undesirable in that commutation is hampered from occurring in the event of low relative velocity of flux motions. The latter is also impractical in that the construction of the static switch is intricate.

SUMMARY OF THE INVENTION

Accordingly, an object of the present invention is to provide a synchronous machine control system capable of urging commutations of the current in the ac winding.

BRIEF DESCRIPTION OF THE DRAWINGS

Further objects, features and advantages of the present invention will become more apparent from the following description taken in conjunction with the accompanying drawings, wherein:

FIG. 5(a) is a diagram illustrating spatial distribution in three-phase AC winding;

FIG. 5(b) is an illustration of a typical delta configuration;

FIG. 5(c) is an illustration of a typical wye configuration;

FIG. 6(a) is a graphical diagram illustrating the waveforms of line currents $i_u$, $i_v$ and $i_w$;

FIG. 6(b) is a graphical diagram illustrating the waveforms of coil currents $i_R$, $i_S$ and $i_T$;

FIG. 6(c) is an illustration of current distribution before the commutation period;

FIG. 6(d) is an illustration of current distribution after the commutation period;

FIG. 6(e) is an illustration showing ΔI distribution before and after commutation;

FIGS. 8(a), 8(b) and 8(c) show typical examples of varied current distribution as a function of commutation in accordance with the present invention;

FIG. 9(a) is a circuit diagram illustrating in single phase bridge valves connected in series;

FIG. 9(b) is a diagram illustrating conductor distribution per phase and pole;

FIG. 9(c) is an illustration of yoke and main pole formed of a solid of laminated core;

FIG. 11 is a circuit diagram showing a brushless embodiment of the invention utilizing a rotary transformer;

FIG. 12(a) is a circuit diagram of another embodiment of the invention comprising a d-axis commutation winding;

FIG. 12(b) is a diagram illustrating cross-sectional opatial distribution of the conductor winding;

FIG. 13(a) is a circuit diagram of another embodiment of the invention;

FIG. 13(b) is a cross-sectional view of a synchronous machine in accordance with the invention.

DESCRIPTION OF THE PREFERRED EMBODIMENTS

Figure 1:
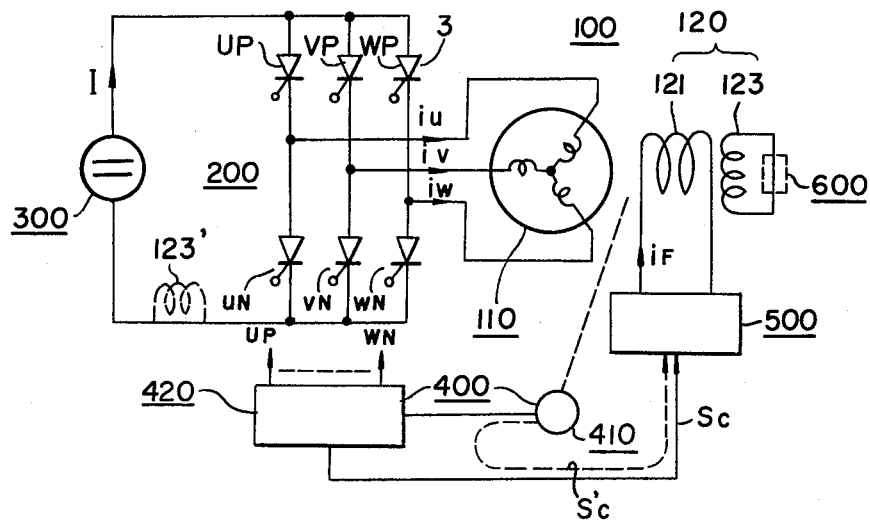
FIG. 1 is a schematic circuit diagram showing one embodiment of the invention.
Figure 2:
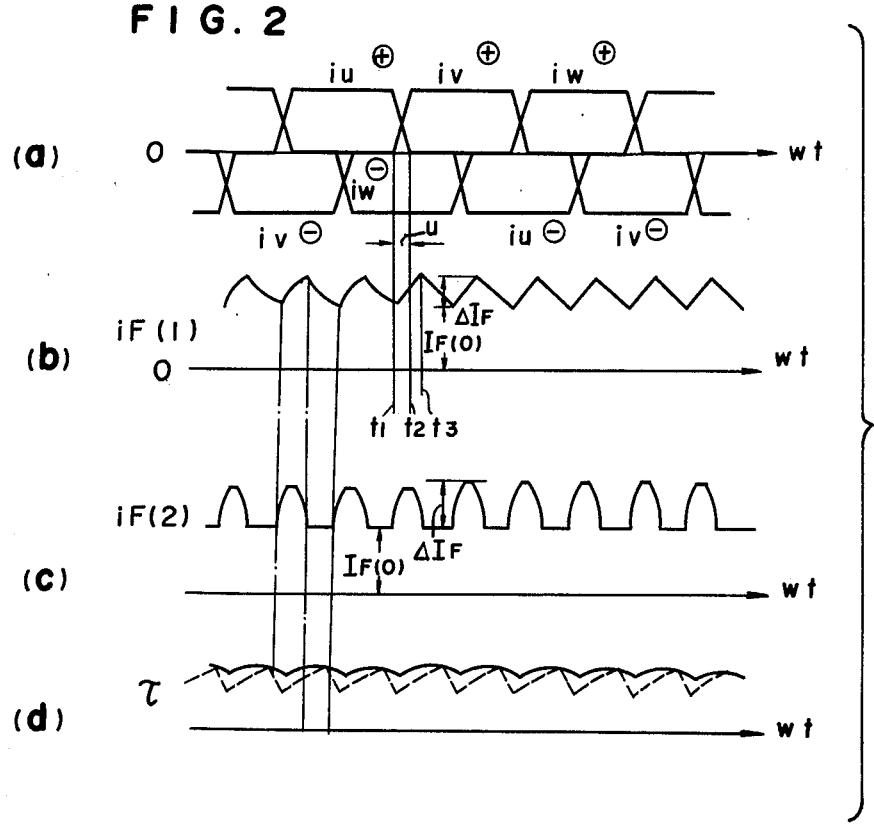
FIG. 2(a) is a graphical diagram illustrating the wave form of phase currents $i_u$, $i_v$ and $i_w$ in the circuit of FIG. 1.
FIG. 2(b) is a graphical diagram illustrating the wave form of field current in the circuit of FIG. 1.
FIG. 2(c) is a graphical diagram illustrating a pulsating field current waveform.
FIG. 2(d) is a graphical diagram illustrating the period $\tau$.

With reference now to FIG. 1, there is shown a circuit diagram of one embodiment of the invention, which comprises: a synchronous machine 100 having an ac winding 110 and a winding 120 on the side of dc exciting means (hereinafter briefly, dc winding); a static switch 200 such as inverter or cycloconverter; and a power source 300. This embodiment employs a dc current source and an electric valve inverter for the power source 300 and the static switch 200 respectively. Further components are a synchronism control device 400 having a tachometer 410 (e.g., position detector or speed detector) and a conduction control device 420;

and a dc power supply device 500. Operations of this system will be described by referring to FIG. 2 in which waveform (a) is of phase currents $i_u$, $i_v$ and $i_w$ in the ac winding 110. These currents are commutated in sequence into positive and negative components indicated by ⊕ and ⊖ symbols. The commutation sequence depends upon the tachometer 410 and the conduction control device 420, as in the manner of known 3-phase bridge type inverter.

According to the invention, the field current $i_F$ in dc field winding 121 is increased synchronously with commutation of each phase current. Field current waveforms are indicated by (b) and (c) in FIG. 2; (b) is a sawtooth waveform or an approximate sawtooth waveform, and (c) a pulsating waveform having a pulse-shape increment. Current increase sections $t_1$-$t_2$-$t_3$ are provided to be synchronous with the commutation section u. In this example, the section $t_1$-$t_2$ corresponds to the section u for which the u-phase positive current $i_u^+$ is commutated to the v-phase positive current $i_v^+$. For this period, the initial value $I_F(O)$ is increased to $(I_F(O)+\Delta I_F)$. To establish such synchronism, a synchronizing signal Sc or Sc' is provided from the conduction control device 420 or the tachometer 410.

At a timing given by the synchronizing signal Sc (Sc'), the dc power supply means 500 operates to increase the field current $i_F$, thus rapidly increasing the supply voltage to the field winding 121. The dc power supply means 500 will be described in detail by referring to FIG. 10 later.

Figure 3A:
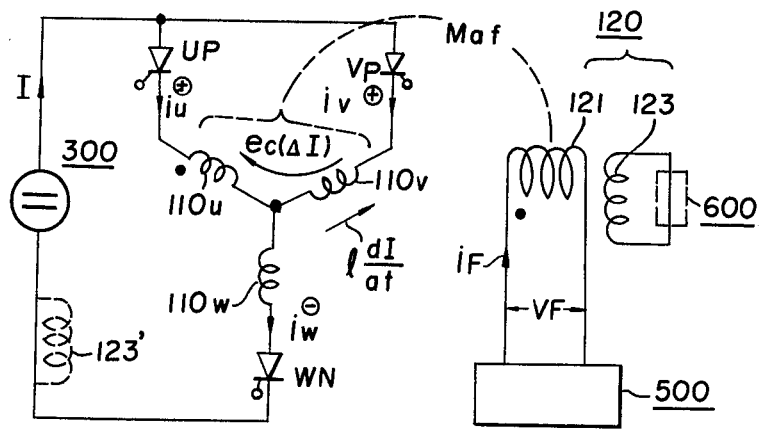
FIG. 3(a) is a circuit diagram, (b) to (d) conceptual diagrams showing current distributions, and (e) a diagram showing a current distribution in a conductor, for illustrating operations of the embodiment as in FIG. 1, FIGS. 4(a) and 4(b) are sectional diagrams of current distribution in a conductor for illustrating features of synchronous machines embodying the invention.
Figure 3B:
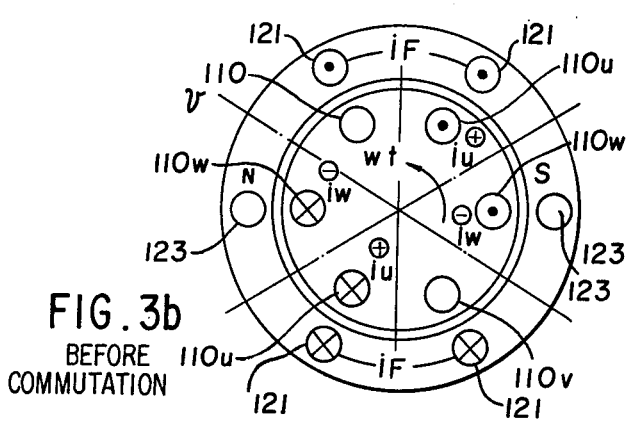
Figure 3C:
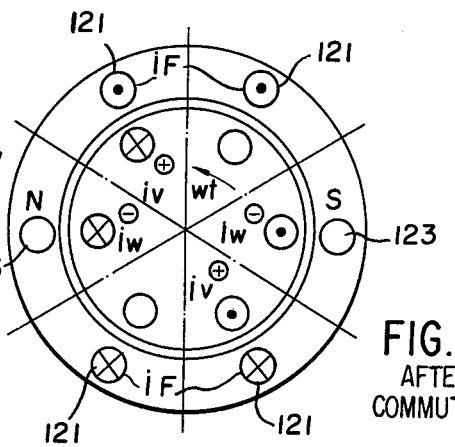

Operations for urging commutation according to the invention will be described below. FIG. 3 illustrates operations for commutation wherein the electric valve VP is turned on following the electric valves WN and UP in the on state, thereby reducing the current $i_u$ and increasing the current $i_v$. In FIG. 3, (a) is a circuit diagram, (b) shows a spatial current distribution of the synchronous machine immediately before commutation, and (c) a current distribution immediately after commutation. In the diagrams (b) and (c), symbols ⊗ and ⊙ indicate current concentrated every electrical angle of $\frac{1}{3}\pi$ for an electrical angle of $2\pi$. FIGS. 3(b) and 3(c) show the state that the composite magnetic axis of commutation coils 110u and 110v is coincident with the magnetic axis (axis d) of field coil 121, as seen between lines 110u and 110v. This state refers to the zero control angle of the inverter corresponding to the zero phase of no load field electromotive force $ea(f)$ across terminals engaging in commutation for the synchronous machine. For explanatory simplicity, assume the rotation speed is low enough and change in the rotating angle $\theta$ during commutation is neglected. In FIGS. 3(b) and 3(c), the arrow-marked wt indicates the direction of torque acting on the ac winding in terms of rotor, and symbols N and S denote field magnetic polarities. Further, the symbols ⊗ and ⊙ directions of current and are used as suffixes at phase currents, indicating polarities of turn-on currents. The state shown in FIG. 3(b) corresponds to that at the timing $t_1$ in FIG. 2(a); and the state shown in FIG. 3(c), to that at the timing $t_2$.

Figure 3D:
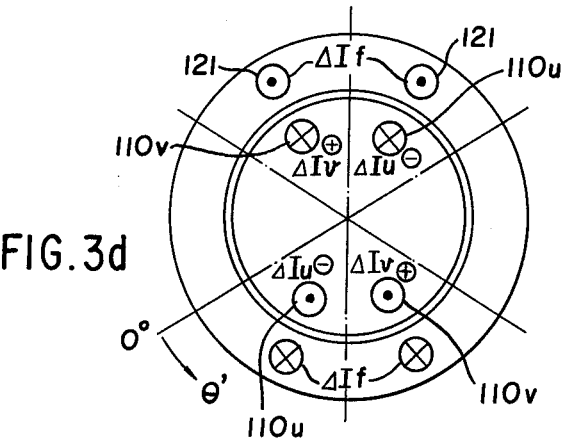
Figure 3E:
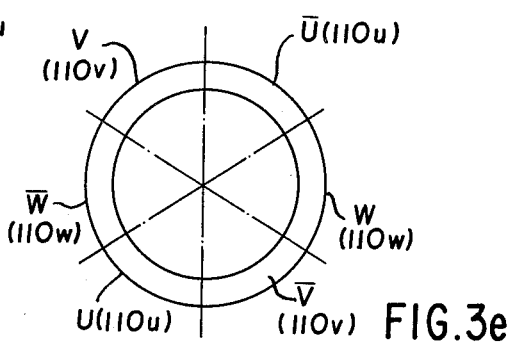

FIG. 3(d) shows a distribution of current variation derived from the difference between current distributions (b) and (c) before and after commutation, wherein the v-phase current $i_v$ increases by $\Delta I_v^⊕ = I$, and the u-phase current $i_u$ decreases by I. Fig. 3(e) shows the arrangement of winding conductors of individual phases wherein symbols U, V and W indicate the beginnings of windings (conductors of positive polarity); and $\overline{U}$, $\overline{V}$ and $\overline{W}$, the ends of windings (conductors of negative polarity). Thus, decrease in the u-phase current $i_u$ signifies increase in the current distribution for the conductor U. This relationship is shown by $\Delta Iu^⊖$ ⊗ mark in FIG. 3(d). It is to be noted that the magnetic axis of the distribution of current variations coincides with the current magnetic axes of the field winding. Needless to say, the current variation distribution is on the distribution in the conductor engaging in commutation between the u-phase and the v-phase, and the composite magnetic axis of the commutating phase windings 110u and 110v coincides with the field magnetic axis. Hence the series of the commutating windings offers a large mutual inductance Maf with respect to the field winding 121 and has the function of transformer.

The present invention utilizes the fact that the magnetic axis of windings engaging in commutation nearly coincides with that (axis d) of the field winding. Thus, with increase in the field current $i_f$ by $\Delta IF$ during commutation, an electromotive force Maf $diF/dt$ ascribed to the increment $\Delta IF$ is induced across the corresponding commutation winding. The polarity of this *emf* is in the arrow-marked direction $e_c$ ($\Delta IF$) in FIG. 3(a). The electromotive force Maf $diF/dt$ causes the current $i_u^⊕$ to be decreased, and the current $i_v^+$ to be increased. In FIG. 3(d), when a field current increment $\Delta I_f$ is given to the field winding 121, current variations $\Delta I_v^⊕$ and $\Delta I_u^⊖$ opposing to flux variations ascribed to the field current increment $\Delta I_f$ are induced across the ac windings. These current variations cause the current distribution (b) before commutation to be changed into the current distribution (c) after commutation. Thus, by causing the field current increment to be changed at commutation, a commutation auxiliary electromotive force $e_c \cdot (\Delta I_f)$ is induced to urge commutation. While the machine is being rotated, an internal velocity electromotive force $e_a$ is additionally induced as in the separately exciting commutation, and the resultant commutation electromotive force $e_c$ will be: $e_c = e_a + e_c \cdot (\Delta I_f)$. Even if the rotating velocity is zero, commutation can be effected by $e_c \cdot (\Delta I_f)$ as long as the value $\Delta I_f$ is large enough. The field winding has an inductive impedance and hence a positive voltage is applied to the field winding during current increase and a negative voltage is applied thereto during current decrease in order to bring about a field current variation or, otherwise, a field current variation is effected by depending on attenuation due to decrease in the field resistance during current decrease. In any case, the voltage used for magnetic effects is one formed of a dc component on which an ac component is superposed.

Improvements in the synchronous machine control system according to the invention will be described below. In FIGS. 1 and 3(a), the reference numeral 123 denotes a q-axis winding having a magnetic axis orthogonal to that of the field winding 121. The q-axis winding is either shorted or supplied with a dc current proportional to the ac winding current, and is serially inserted in the dc input path to the inverter 200 as indicated by the dotted line. These q-axis windings have their centers of conductor distribution as indicated by circles 123 in FIGS. 3(b) and 3(c), being electromagnetically orthogonal to the d-axis field winding 121. The deflection angle (with reference to the dc winding magnetic flux) at the magnetic axis of the ac winding current distribution assumes two extremes before and after commutation. Accordingly, the magnetic axis of its plan current distribution nearly coincides with that of the q-axis winding 123 (including 123'). For example, in the circuit shown in FIG. 3(a), the magnetic axis of the series of ac windings 110u and 110w or of ac windings 110v and 110w is coincident with that of the q-axis winding 123, and there is a spatial relationship between them where mutual inductance Mq is large. Therefore the loop of inverter dc current I is intensely coupled to the q-axis winding 123.

When the q-axis winding 123 is shorted, voltage Mq dI/dt ascribed to the ripple component of the inverter input current I is shorted by the q-axis winding 123 whereby the component dI/dt of the voltage is suppressed. This means the fact that a pulsating current I is supplied to the primary winding of a transformer with its secondary winding shorted. In this manner, the voltage dI/dt is suppressed at the ac winding 110. This serves to reduce interference with a reverse bias to the electric valves UP, VP and WN immediately after commutation. The term 'interference with a reverse bias' is taken to mean the operation that the voltage dI/dt causes the reverse bias voltage to be lowered or turned into a forward bias voltage for the interval of excess angle for which a reverse bias voltage is to be applied to the electric valve only if no ripple is present in the current I. For example, assume the electric valve UP stops conducting and the electric valve VP becomes conducting where $i_v = I$, as in FIG. 3(a). After this commutation, the voltage ldI/dt at the v-phase winding in the corresponding commutation loop is in the arrow-marked direction, and increase (dI/dt>0) in the input current I brings about a forward voltage component to the electric valve UP which is to be reversely biased. Shorting the q-axis winding 123 serves to reduce the voltage generating factor l, thus suppressing the reverse bias interference phenomenon. The voltage generating factor l is reduced due to the fact that the v-phase winding 110v interlinks also with the d-axis winding 121.

A dc power is supplied to the q-axis winding in proportion to the inverter dc input current. In this case, the power supply stands at a polarity at which a magneto-motive force is generated opposite to the polarity of a magnetomotive force generated across the ac winding. For this operation, a compensation winding 123 is serially inserted thereinto. Alternatively, a proportionated power may be derived from an external power source. In these cases, the magnetomotive force generated across the armature is canceled by the magnetomotive force across the q-axis winding whereby the voltage dI/dt is also suppressed. At the same time, the reaction of the armature can be prevented.

When the system is provided with a q-axis dc proportional power supply device 600 (indicated by dotted lines in FIGS. 1 and 3), it is desirable that the impedance of the q-axis winding loop be low. To this effect, a relatively low impedance loop passing through the rectifier element of the rectifier or through the ac power source is to be formed. In such arrangement, the foregoing shorting effect is also available.

The synchronous machine 100 used for the invention is preferably of cylindrical type. More specifically, punched magnetic plates each having a slot in which a winding conductor is embedded are laminated to build a core. FIGS. 4(a) and 4(b) schematically show conductor distributions on the magnetic plate. The diagram (a) is of rotating ac winding type, and (b) is of rotating dc winding type, wherein the reference Wa indicates a cross-sectional distribution region of the conductor of ac winding 110, Wf a cross-sectional distribution region of the conductor of field winding 121, and Wc a cross-sectional distribution region of the conductor of q-axis winding 123. These regions are plotted over an electrical angle of $2\pi$. In this example, the distribution of the winding 121 is larger than that of the winding 123. Instead, the latter may be larger than the former. In such cylindrical construction, the dc winding can be mounted spatially on the plane of the gap, permitting the magnetic coupling coefficient between the ac winding 110 and the dc winding 120 (121, 123) to be increased. At the same time, commutation by the mutual inductance is improved and the effect of suppressing interference with reverse bias is increased.

Improvements in the commutation d-axis winding according to the invention will be described below. FIG. 3(d) shows arrangements of windings engaging in commutation, variations in current distribution before and after commutation, and varied current distribution. When windings are distributed with phases 60° apart as in FIG. 3(c), the variation current is uniformly distributed in the range of an electrical angle of $\frac{2}{3}\pi$ per electrical angle $\pi$. In this case, it is desirable that the current in the d-axis commutation winding which serves also as the field winding 121 be uniformly distributed in the range of an electrical angle of $\frac{2}{3}\pi$ ($Wf = \frac{2}{3}\pi$) per electrical angle $\pi$ as shown in FIGS. 4(a) and 4(b). The distribution for a spatial angle $\theta'$ (in terms of electrical angle) of a variation in current, i, is shown in FIG. 8(a).

There are other $\Delta i$ distributions available depending on the method of winding, the circuit of electric valves and the system for controlling the electric valves; FIG. 2(a) shows a typical example of $\Delta i$ distribution pattern in 3-phase 3-wire system. While FIG. 5(a) shows an example of spatial distribution region, in cross-section, of the conductor of 3-phase ac winding 110. This example is of the known 120° short pitch 2-layer winding with phases distributed 60° apart. The same distribution pattern is available when the coil is of 180° full pitch 2-layer winding with phases distributed 120° apart. In FIG. 5(a), conductors R and $\overline{R}$ constitute the reciprocal path (both coil arms) of the R-phase coil. Conductors S and $\overline{S}$, and T and $\overline{T}$ do the same with respect to the S-phase and the T-phase respectively. FIGS. 5(b) and 5(c) show delta and wye connections, respectively, of the above 3-phase winding. In the delta connection, the following relationships exist between the phase line currents $i_u$, $i_v$ and $i_w$ which flow in the terminals U, V and W and the coil currents $i_R$, $i_S$ and $i_T$ of the individual phases:

$$i_u = i_R - i_T$$
$$i_v = i_S - i_R$$
$$i_w = i_T - i_S$$

(1)

FIG. 6(a) shows waveforms of the line currents $i_u$, $i_v$ and $i_w$; and FIG. 6(b), waveforms of the coil currents $i_R$, $i_S$, and $i_T$. FIGS. 6(c) and 6(d) show current distributions before and after the commutation period u in FIGS. 6(a) and 6(b), which correspond to the conductor distribution shown in FIG. 5(a). In FIG. 6, the symbols ⊗ and ⊙ in larger size indicate that the absolute value of the corresponding coil current is $\frac{2}{3}$I (where I is the peak line current), and the symbols ⊗ and ⊙ smaller size indicate that the absolute value of the corresponding coil current is $\frac{1}{3}$I. The current distributions shown in FIGS. 6(c) and 6(d) are indicated by the symbols ⊗ and ⊙ where the individual current distributions are concentrated at intervals of electrical angle $\pi/3$ for the respective phases as in FIG. 3. The $\Delta I$ distribution before and after commutation is shown in FIG. 6(e) as in FIG. 3(d), offering a distribution pattern for the spatial angle $\theta'$ in FIG. 8(a). Accordingly, for this delta connection, the commutation d-axis winding of 120° uniform distribution ($Wf = 120°$) as in FIG. 4 is suited.

Figure 7A:
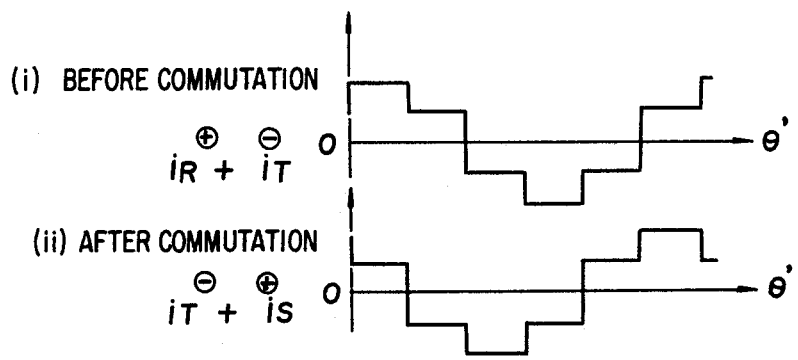
FIG. 7(a) is a graphical diagram illustrating the current phase relationship before and after commutation.
Figure 7B:
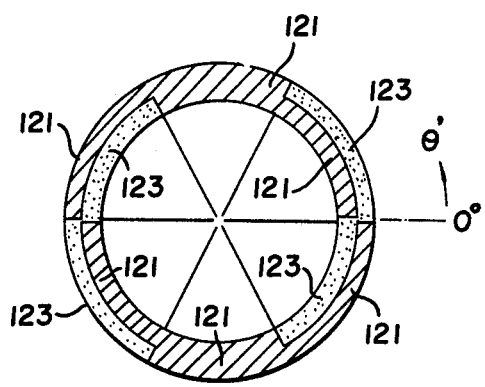
FIG. 7(b) is a diagram illustrating the q-axis winding distribution.

When the 3-phase winding as in FIG. 5(a) is used in wye connection, current relationships are: $i_u=i_R$, $i_v=i_S$ and $i_w=i_T$ since the windings R, S and T are serial to the lines of individual phases. Assume $i_R=i_u=I$ and $i_T=i_w=-I$ before commutation. Then the current distribution for the spatial angle $\theta'$ corresponding to that in FIG. 5(a) is expressed as in (i) of FIG. 7(a). The current relationships after commutation are: $i_S=i_v=I$ and $i_w=-I$. Hence the resultant current distribution is expressed as in (ii) of FIG. 7(a), corresponding to FIG. 5(a). FIG. 8(b) shows a $\Delta I$ distribution pattern, i.e., the difference between the above two current distributions. Therefore, when the winding as in FIG. 5(a) is employed in wye connection as in FIG. 5(c) for operation in current waveform as in FIG. 2(a), the desirable conductor sectional distribution of the commutation d-axis winding 121 (which may be used also as a field winding) should be one indicated by oblique lines in FIG. 7(b). In FIG. 7(b), the dotted area indicates the distribution of the q-axis winding.

FIG. 9(a) shows the arrangement that m numbers of single phase bridge electric valves are connected in series, m-phase ac windings are connected to the ac terminals of the individual bridges, and conductors are distributed in the region of $\pi/m$ per phase and pole as in FIG. 9(b). Asuume commutation is performed for each phase. Then one phase of ac winding engages in commutation and hence the distribution width of $\Delta I$ should be $\pi/m$ as shown in FIG. 8(c). In FIG. 9(b), it may be so arranged that windings $110_1$ and $110_m$ are distributed being overlapped with windings of k-number of phases, or commutations may be overlapped for j-number of phases; the $\Delta I$ distribution depends upon the method of winding and the method of turn-on control.

In the embodiment shown in FIG. 9, as described, $\Delta I$ distribution can be confined in a narrow range $\Delta \theta$. In this case, the commutation d-axis winding can be concentrated in a narrow range $\Delta \theta'$ corresponding to $\Delta \theta$. The dc field winding 121 may be wound being either distributed or concentrated in an arbitrary range, with the commutation d-axis winding 122 arranged in a limited range $\Delta \theta'$. One example of this arrangement is illustrated in FIG. 9(c) wherein a yoke 150 and a main pole 151 can be constituted of solid core or thick laminated core. In this embodiment, only the commutation q-axis winding pole 152 is made of a laminated core.

In the foregoing embodiments, the distribution of a variation in current attending on commutation, and the distribution of the commutation d-axis winding (including the field winding) corresponding to the $\Delta I$ distribution have been described. Thus, according to the invention, the coefficient of electromagnetic coupling between the commutation winding and the commutation d-axis winding is improved and a means 540 for supplying current increment to the commutation d-axis winding, which is necessary for facilitating commutation, is simplified. (The means 540 will be described below in more detail.)

Figure 10A:
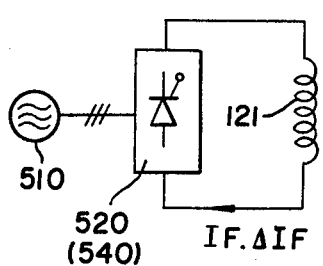
FIGS. 10(a), 10(b), 10(c), 10(d), 10(e) and 10(f) are circuit diagrams showing commutation urging means embodying the concepts of the present invention.
Figure 10B:
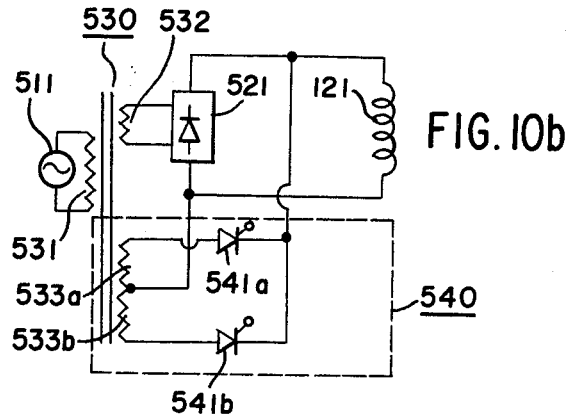
Figure 10C:
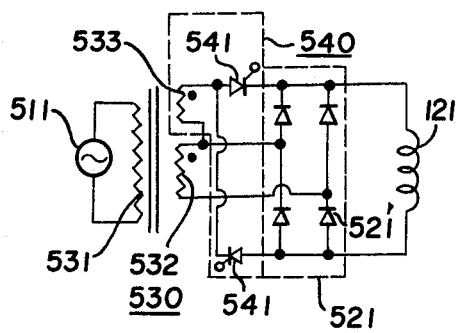
Figure 10D:
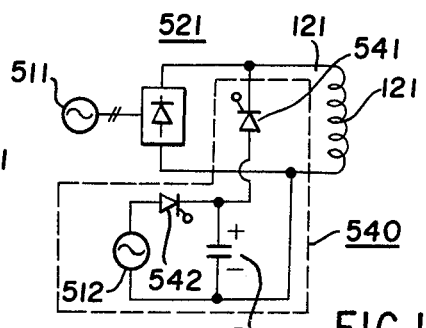
Figures 10E, 10F:
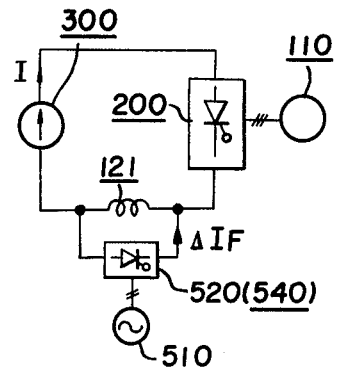

An example of dc power supply device 500 comprising a commutation d-axis current increment supply means 540 will be described by referring to FIG. 10. FIG. 10(a) shows a circuit comprising an ac power source 510, a controlled rectifier 520, and a field winding 121 which is supplied with power from the power source 510 through the rectifier 520. In this circuit, the output voltage of the rectifier 520 is selected to be sufficiently higher than the voltage drop ($I_f \times R_F$) across the field winding 121, to permit the rectifier output voltage to be rapidly raised when the desired current increment $\Delta I_F$ is effected. This operation is known as "forcing." In this embodiment, the controlled rectifier 520 serves also as the current increment supply means 540. FIG. 10(b) shows a circuit comprising a transformer 530 having a secondary winding 532, high voltage tertiary windings 533a and 533b, and a primary winding 531 connected to an ac power source 511. The secondary winding 532 is for supplying field current at all times, and the tertiary windings 533a and 533b for supplying increment current. The secondary winding 532 is connected to the field winding 121 through a rectifier 521. The tertiary winding 533 is connected to the field winding 121 through controlled rectifiers 541a and 541b. In this example, the tertiary winding 533 is parallel with the field winding 121, although it may be serial with the field winding 121. For the supply of increment current, the controlled rectifier 541 is turned on to pass high voltage power from the tertiary winding 533. The rectifier 541 may be of single phase half-wave rectifier. FIG. 10(c) shows another arrangement in which the secondary winding 532 and the tertiary winding 533 are connected in series to each other, and the half-wave controlled rectifier 541 is connected to one dc terminal of the rectifier 521. By turning on the controlled rectifier 541 at supply of increment current, a half-wave high voltage is supplied to the field winding 121 through noncommon side rectifier element 521' of the rectifier 521. Another circuit arrangement is shown in FIG. 10(d), comprising a means for charging a capacitor 543 to a high voltage, such as an ac auxiliary power source 512 and a charging rectifier 542. The voltage charged across the capacitor 543 is supplied, in a pulse form, to the field winding via an increment supply switch 541. Another circuit arrangement, as in FIG. 10(e), has the field current divided into windings 121a and 121b, or the commutation d-axis winding 122 connected in series to the winding 121a. Controlled rectifiers 541a and 541b are provided together with rectifiers 521' which are half the bridge rectifier 521, and an ac power source 511. The output voltage of the controlled rectifier is supplied to the part of the winding 121a or 121b or to the commutation d-axis winding 122. When the rectifiers 541a and 541b are turned on, the full voltage is applied to the part of the winding, causing the current to be increased. While FIG. 10(f) shows another arrangement wherein the embodiment of FIG. 10(a) is applied to a series field system. In the embodiments shown in FIG. 10, the transformer 530 may be of rotary type.

FIG. 11 is a circuit diagram showing another embodiment of the invention wherein a brushless arrangement is realized by the use of a rotary transformer 530. A winding 533, a rectifier 541 and a flywheel diode 542 constitute a single phase half-wave rectifier circuit, which is connected in series to the field winding. These elements, together with rotary rectifiers 532 and 521, are arranged on the rotor. A controlled rectifier 541 is provided, comprising a turn-on means 541' and a receiving means 546, which are supplied with power from a quaternary winding 534 tapped from the tertiary winding via a rectifier element 545. The receiving means may be of photosensing element, high frequency mutual inductance element, magnetosensing element or the like. There is provided a transmission means 547 formed of a lamp (such as light-emitting diode, neon lamp, xenon lamp), high frequency mutual inductance element (such as eddy current element, magnetic element, nonmagnetic element), magnet element, or the like. The circuit may comprise a contactless switch, proximity switch, high frequency transmission and receiving elements, etc.

The transmission signal may be a turn-on signal of a given phase synchronous with an ac component branched from the ac power source 511. More specifically, an ac voltage is supplied from the ac power source 511 to the transmission means 547 through thyristor 549 and impedance element 548. The receiving means 546 is rotated with the rotor, and the transmission means 547 is kept operated. The receiving means 546, when rotated to the position of the transmission means 547, is operated to turn on the controlled rectifier 541. The transmission and receiving means 547 and 546, when suitably located relative to each other, can be used as a rotation detecting means 410 and a synchronizing signal (Sc) generator.

FIG. 12(a) is a circuit diagram of another embodiment of the invention which comprises a commutation $d$-axis winding, and FIG. 12(b) is a diagram showing a spatial distribution, in cross-section, of the conductor of the winding. In FIG. 12, the control angle $\gamma_o$ of the electric valve of electric valve device 200 with respect to the ac winding of a synchronous machine is selected to be in the range of 30° to 60° when separately excited commutation is performed where no $q$-axis dc excitation winding (e.g., compensation winding or interpole winding) is used. The control angle $\beta$ at which the system starts increasing the current for commutation by the $d$-axis winding according to the invention is selected to be in the range of $\gamma_o$ to 0°. When the control angle $\beta$ is not 0°, the magnetic axis of the $d$-axis field winding 121 and that of the winding engaging in commutation have a deflection angle equal to $\beta$ where the two magnetic axes are not coincident with each other. Further, because the control angle $\beta$ assumes a value $\pi - \gamma_o$ in the event of negative torque rotation (where $\gamma_o$ is an angle in the event of positive torque rotation), the deflection angle will assume two different values, $\pm \beta$ with respect to the $d$-axis. The circuit in FIG. 12 offers improvements on the control angle deflection, comprising commutation $d$-axis windings 122a and 122b with deflection angles $\pm \beta$ with the field winding 121. (The $d$-axis winding is taken to mean one having a proximity magnetic axis with the $d$-axis in reference to the $d$-axis.) The windings 122a and 122b are connected to increment current supply means 540a and 540b respectively and used for operation of positive torque rotation and negative torque rotation respectively. FIG. 12(b) shows in cross-section a distribution of conductors of $d$-axis windings 122a and 122b and field winding 121. Instead of the increment current supply means 540a and 540b, dc power supply means 500a and 500b capable of supplying current to the field winding at all times may be used. Then the field winding 121 operated all through and the field current supply means 550 operated all through can be obviated when the $d$-axis windings 122a and 122b are of field windings 121a and 121b with magnetic axes deflected $\pm \beta$ from each other. In such arrangement, the current component to be supplied to the field winding at all times can be derived from the dc power supply means 550a and 500b, and the increment current for commutation can be derived from either dc power supply means 500a or 500b according to the torque direction. Thus, according to the embodiment in FIG. 12, the coefficient of coupling between the field winding and the ac winding engaging in commutation can be maintained high even if the control angle $\beta$ largely varies.

FIG. 13 illustrates another embodiment of the invention; (a) is a circuit diagram, and (b) a cross-sectional view of synchronous machine 100. This synchronous machine has 2 pairs of rotors and stators, comprising a first ac winding 110a, a second ac winding 110b, a first field winding 121a, a second field winding 121b (or commutation $d$-axis winding 122), a first $q$-axis winding 123a, and a second $q$-axis winding 123b. Thus a first synchronous machine having the first winding, and a second synchronous machine having the second winding are constituted, the two synchronous machines are arranged in tandem form on the same rotating axis. The first ac winding and the second ac winding are connected in series to each other phase by phase. This series connection may be made for each corresponding slot conductor of individual windings, of which the cross-section is shown in FIG. 13(b); a pair of coils with slot dimensions adjusted can be mounted therein across armature cores 141a and 141b of the two synchronous machines. In this construction, the first synchronous machine can be built into a salient-pole type of solid main magnetic shaft 151a, and the second synchronous machine into a cylindrical laminated core type 151b. An increment current for commutation is supplied to the second field winding 121b. The continual field current may be supplied to the first field winding only or to both the first and second field windings. When the continual current is supplied to both the windings, the two field windings are connected as shown in FIG. 10(f). In such case, the two synchronous machines generate effective torques, thus offering a composite output torque.

Figure 14:
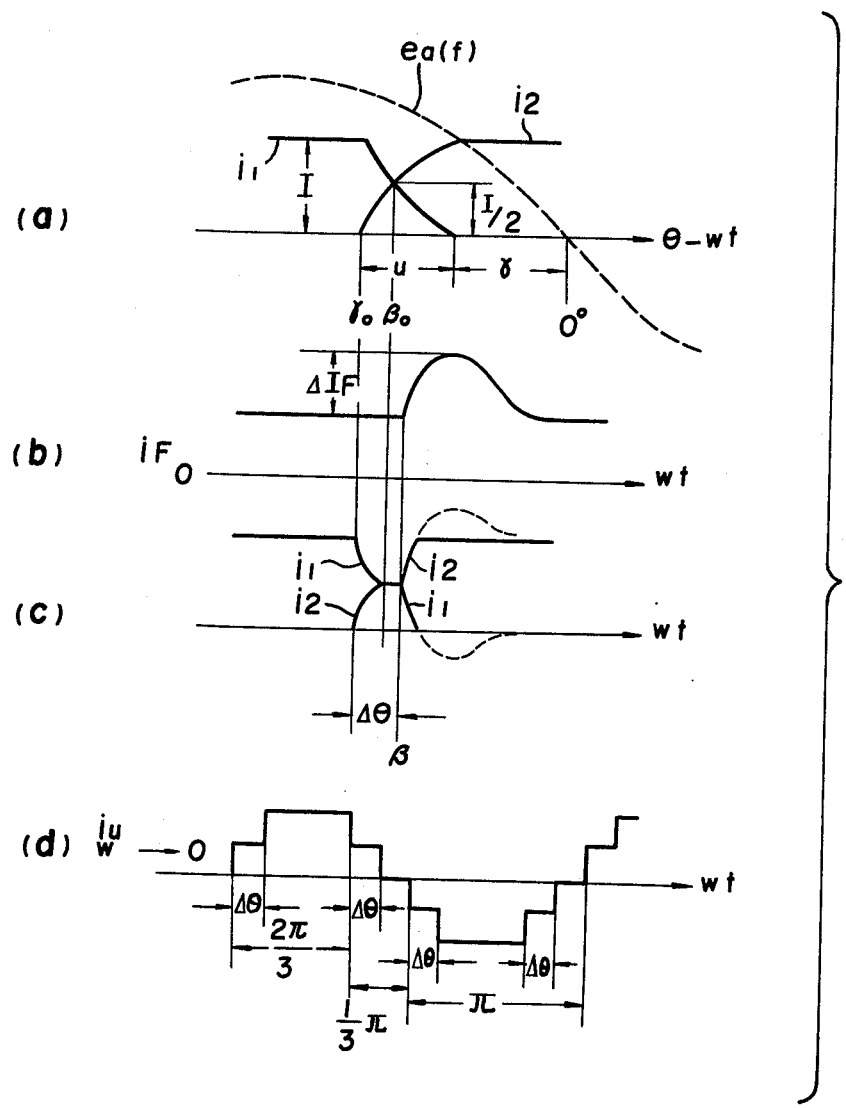
FIG. 14 is a waveform diagram showing operations of other embodiments of the invention.

FIG. 14 shows waveforms for illustrating another embodiment of the invention wherein the relationship between the control angle $\beta$ for determining the increment current necessary for commutation and the turn-on control angle $\gamma_o$ of the electric valve. FIG. 14(a) shows waveforms in the neighborhood of commutation overlap $u$ formed during high speed rotation; waveforms $i_1$ and $i_2$ are of currents in the windings engaging in commutation, and waveform $ea(f)$ is of internal electromotive force (i.e., velocity magnetomotive force generated by the field concerned in commutation). When the phase at which the internal electromotive force $ea(f)$ passes zero level is 0°, the relationship between the control angle $\gamma_o$ (i.e., commutation starting phase), the overlap angle u, and the excess angle $\gamma$ is expressed as: $\gamma = \gamma_o - u$.

Assume the current $i_1$ before commutation intersects the current $i_2$ after commutation at phase $\beta_o$ on the above high speed separate excitation commutation waveform. Although the starting phase $\beta$ for effecting a $d$-axis current increment $\Delta I_F$ is supposed to lie between $\beta_o$ and 0° as described previously, it may be started at a phase of $\beta_o$ to 0° in this embodiment. The phase difference $\Delta\theta$ between $\gamma_o$ and $\beta$ is determined in the following manner. In the 6-phase electric valve device, $\Delta\theta$ is about 30°. Generally, an n-phase electric valve device having electric valves turned on at n-numbers of different phases, $\Delta\theta$ is about $\pi/n$. Thus, by differentiating the control angle $\gamma_o$ of the electric valve from the control angle $\beta$ at which an increment current for commutation is supplied, current waveforms for commutation during low speed rotation will become such as shown in FIGS. 14(b) and 14(c), wherein the rotating electrical angle $\theta$ is $\omega t$ on the abscissa. The angular velocity $\omega$ is sufficiently lower than that in FIG. 14(a).

At low speed rotation, the internal electromotive force is low and the turn-on operation takes a longer time, with the result that the winding resistance becomes dominant. By simply turning on an electric valve, commutation advances to the state $i_1 = i_2$ (where the resistance balances) without the internal velocity electromotive force. The state $i_1 = i_2$ is reached before electrical angle $\beta_o$. Then a current increment $\Delta I_F$ is supplied at phase $\beta$ as in FIG. 14(b) whereby the current $i_2$ rapidly increases and $i_1$ decreases, allowing a commutation to be completed.

FIG. 14(d) shows a waveform of $u$-phase line current $i_u$ in the electric valve device of FIG. 1(a) when the rotating angular velocity $\omega$ is a limit of zero ($\lim \omega \to 0$). In other words, a commutation progresses in two steps, resulting in an output current waveform equivalent to that obtainable with a 12-phase electric valve device. Accordingly, the torque pulsation in low speed region is largely reduced. Furthermore, the variation in the current for commutation is already halved because commutation progresses as far as $i_1 = i_2$, and hence the value $\Delta I_F$ is also halved. Therefore, by causing the phase $\beta$ for effecting the increment $d$-axis current for commutation to lag behind the control angle $\gamma_o$ of the electric valve, the torque pulsation in low speed region is reduced and the necessary increment current $\Delta I_F$ for commutation is also reduced.

In the arrangement that the windings 122 and 121b for supplying increment current are provided separately from the field winding 121 as in FIGS. 10(f), 12 and 13, the increment current may be varied over positive and negative polarities; for example, the increment current may be ac of frequency proportional to the number of commutations per cycle on the side of ac winding.

According to the invention, as has been described above, a current variation is brought about across a winding on the side of dc excitation means whereby a commutation (current variation) is urged in the ac windings. Furthermore, the invention facilitates turn-off at the static switch connected to the ac winding. Further, the torque pulsation can be reduced by causing the starting phase for giving a current variation to the winding on the side of dc excitation means to lag behind the starting phase for supplying current to the static switch.

What is claimed as new and desired to be secured by letters patent in the United States is:

1. A synchronous machine control apparatus comprising:
   a synchronous machine having a polyphase armature winding and a first DC excitation winding;
   a static switch converter having a plurality of AC output terminals connected to said armature winding and a plurality of DC input terminals for connection to a power source, and consisting of a plurality of static switches, each static switch connected between one of said AC output terminals and one of said DC input terminals;
   commutation control means for changing current flow from at least one of said static switches to at least one of the others of said static switches to provide commutation for a part of said armature winding;
   DC power supply means for supplying a DC current to said first DC excitation winding;
   said DC power supply means including current increment means for incrementing the current in said first DC excitation winding in synchronous relationship with said commutation to induce an auxiliary electromotive force in the part of said armature winding engaging in said commutation;
   whereby said commutation is assisted by said current increment means.

2. The synchronous machine control apparatus recited in claim 1 including:
   a second DC excitation winding having a magnetic axis substantially orthogonal to the magnetic axis of said first DC excitation winding.

3. The synchronous machine control apparatus recited in claim 2 wherein the second DC excitation winding is shorted.

4. A synchronous machine control apparatus recited in claim 2 wherein said second DC excitation winding is connected in series with one of the plurality of DC input terminals of said inverter.

5. The synchronous machine control apparatus recited in claim 1 wherein said synchronous machine comprises a stator core having a cylindrical inner surface and a rotor core having a cylindrical outer surface.

6. The synchronous machine control apparatus recited in claim 1 wherein said static switch converter is an inverter and the static switches are electric valves.

7. The synchronous machine control apparatus recited in claim 1 wherein said DC power supply means includes a controlled rectifier.

8. The synchronous machine control apparatus recited in claim 1 wherein the DC power supply means includes:
   a transformer having a secondary winding and a tertiary winding;
   means for rectifying the output of the secondary winding and supplying the rectified power to said first DC excitation winding; and
   a controlled rectifier element connected between said tertiary winding and said first DC excitation winding.

9. The synchronous machine control apparatus recited in claim 1 wherein the DC power supply means includes:
   a capacitor and a controlled rectifier element connected across said DC excitation winding.

10. The synchronous machine control apparatus recited in claim 1 wherein said DC power supply means includes:
    a bridge connection type rectifier circuit for supplying power to said DC excitation winding; and
    a pair of controlled rectifiers having input terminals connected to said bridge connected type rectifier circuit and output terminals connected to an intermediate point of said first DC excitation winding.

11. The synchronous machine control apparatus recited in claim 8 wherein said transformer is of a rotary type.

12. A synchronous machine control apparatus recited in claim 1 wherein:

said first DC excitation winding is wound on a core formed from a stack of laminated plates.

13. A synchronous machine control apparatus comprising:
- a synchronous machine having a polyphase armature winding and a DC excitation winding;
- a static switch converter having a plurality of AC output terminals respectively connected to said armature winding and a plurality of DC input terminals for connection to a power source, and consisting of a plurality of static switches, each static switch connected between one of said AC output terminals and one of said DC input terminals;
- commutation control means for changing current flow from at least one of said static switches to at least one of the others of said static switches to provide commutation for a part of said armature windings;
- DC power supply means for supplying a DC current to said DC excitation winding;
- said DC power supply means including current increment means for incrementing the current in said DC excitation winding in time lag relationship with said commutation to induce an auxiliary electromotive force in the part of said armature winding engaging in said commutation;
- whereby said commutation is assisted by said current increment means.

* * * * *